United States Patent
Fisher et al.

(10) Patent No.: US 7,892,647 B2
(45) Date of Patent: *Feb. 22, 2011

(54) INTERLAYERS COMPRISING STABILIZED INFRARED ABSORBING AGENTS

(75) Inventors: William Keith Fisher, Suffield, CT (US); Bruce Edward Wade, West Springfield, MA (US); Paul Daniel Garrett, Sturbridge, MA (US)

(73) Assignee: Solutia Incorporated, St. Louis, MO (US)

( * ) Notice: Subject to any disclaimer, the term of this patent is extended or adjusted under 35 U.S.C. 154(b) by 80 days.

This patent is subject to a terminal disclaimer.

(21) Appl. No.: 11/302,822

(22) Filed: Dec. 14, 2005

(65) Prior Publication Data

US 2007/0134499 A1    Jun. 14, 2007

(51) Int. Cl.
  *B32B 27/38* (2006.01)
  *B32B 27/20* (2006.01)
  *C08L 63/00* (2006.01)
  *C08K 3/10* (2006.01)
  *C08K 3/38* (2006.01)

(52) U.S. Cl. ............... 428/413; 252/582; 252/587; 428/414; 428/415; 428/417; 428/500; 523/457; 523/459; 525/523; 525/529

(58) Field of Classification Search ............ None
See application file for complete search history.

(56) References Cited

U.S. PATENT DOCUMENTS

| | | | |
|---|---|---|---|
| 5,529,848 A | 6/1996 | D'Errico | |
| 5,529,849 A | 6/1996 | D'Errico | |
| 6,221,945 B1 | 4/2001 | Kuno et al. | |
| 6,620,872 B2 | 9/2003 | Fisher | |
| 6,663,950 B2 | 12/2003 | Barth | |
| 6,859,310 B2 | 2/2005 | Simpson | |
| 6,891,667 B2 | 5/2005 | Simpson | |
| 6,911,254 B2 | 6/2005 | Fisher | |
| 2003/0054160 A1* | 3/2003 | Fisher et al. | 428/328 |
| 2003/0224182 A1 | 12/2003 | Simpson | |
| 2003/0232181 A1 | 12/2003 | Simpson | |
| 2004/0218260 A1 | 11/2004 | Simpson | |
| 2004/0234778 A1 | 11/2004 | Fukatani | |
| 2005/0079340 A1 | 4/2005 | Barth | |
| 2005/0134959 A1 | 6/2005 | Simpson | |
| 2005/0161642 A1 | 7/2005 | Takeda | |
| 2007/0048519 A1 | 3/2007 | Anderson | |
| 2007/0135534 A1* | 6/2007 | Fisher et al. | 523/445 |

FOREIGN PATENT DOCUMENTS

| | | |
|---|---|---|
| EP | 0631861 | 1/1995 |
| EP | 1008564 | 6/2000 |
| EP | 1541012 | 6/2005 |
| EP | 1559743 | 8/2005 |
| JP | 58038741 A | 3/1983 |
| JP | 1138541 A | 5/1989 |
| JP | 7097463 A | 4/1995 |
| JP | 2001-089202 A | 4/2001 |
| JP | 2004-338963 A | 12/2004 |
| JP | 2005-336242 A | 12/2005 |
| WO | WO 2007/070746 A2 | 6/2007 |

OTHER PUBLICATIONS

Machine translation of JP 2001-089202 A, provided by the JPO website (no date).*
Machine translation of JP 2005-336242 A, provided by the JPO website (no date).*
Database WPI Week 200714 Derwent Publications Ltd., London, GB; AN 2007-135073 XP002440807 & JP 2006 348168 abstract, Dec. 28, 2006, Mitsui Chem Inc.
International Search Report for Int'l Application No. PCT/US2006/061536; Date Mailed: Jun. 29, 2007.
Written Opinion of the International Searching Authority for Int'l Application No. PCT/US2006/061536; Date Mailed: Jun. 29, 2007.
International Preliminary Report on Patentability for Int'l Application No. PCT/US2006/061536; Date Mailed: Jun. 18, 2008.
Third Party Submissions for Japanese Application No. 2008-545905; Date Submitted: Jan. 28, 2010 (First Page English translation only).

* cited by examiner

*Primary Examiner*—Michael J Feely
(74) *Attorney, Agent, or Firm*—Lewis, Rice & Fingersh, L.C.

(57) ABSTRACT

The present invention is in the field of polymer sheets and multiple layer glazing panels comprising infrared absorbing agents, and, more specifically, the present invention is in the field of polymer sheets and multiple layer glazing panels comprising infrared absorbing agents that selectively absorb infrared radiation. In various embodiments of the present invention, an interlayer includes lanthanum hexaboride, which effectively absorbs infrared radiation at about 1,000 nanometers, and an epoxy, which stabilizes the lanthanum hexaboride agent.

9 Claims, 3 Drawing Sheets

INTERLAYERS COMPRISING STABILIZED INFRARED ABSORBING AGENTS

FIELD OF THE INVENTION

The present invention is in the field of polymer sheets and multiple layer glazing panels comprising infrared absorbing agents, and, more specifically, the present invention is in the field of polymer sheets and multiple layer glazing panels comprising infrared absorbing agents that selectively absorb infrared radiation.

BACKGROUND

Poly(vinyl butyral) (PVB) is commonly used in the manufacture of polymer sheets that can be used as interlayers in light-transmitting laminates such as safety glass or polymeric laminates. Safety glass often refers to a transparent laminate comprising a poly(vinyl butyral) sheet disposed between two sheets of glass. Safety glass often is used to provide a transparent barrier in architectural and automotive openings. Its main function is to absorb energy, such as that caused by a blow from an object, without allowing penetration through the opening or the dispersion of shards of glass, thus minimizing damage or injury to the objects or persons within an enclosed area. Safety glass also can be used to provide other beneficial effects, such as to attenuate acoustic noise, reduce UV and/or IR light transmission, and/or enhance the appearance and aesthetic appeal of window openings.

In many applications it is desirable to use safety glass that not only has the proper physical performance characteristics for the chosen application, but also has light transmission characteristics that are particularly suitable to the end use of the product. For example, it will often be desirable to limit infrared radiation transmission through laminated safety glass in order to provide improved thermal properties.

The ability to reduce transmission of infrared radiation, and specifically near infrared radiation, can be a particularly desirable characteristic of multiple layer glazing panels, and particularly for safety glass that is used in automotive and architectural applications. Reducing the transmission of infrared radiation can result in the reduction of heat generated by such radiation within an enclosed space.

Many examples exist in the art of compositions and methods to reduce infrared radiation transmission through multiple layer glazing panels. Included among these is the use of agents that selectively absorb radiation in the infrared region. One effective, known agent is lanthanum hexaboride ($LaB_6$). Lanthanum hexaboride, while an excellent selective absorber of near infrared radiation, is subject to molecular degradation due to commonly encountered environmental conditions found in interlayers, which compromises the infrared absorbing ability of the interlayers.

Further improved compositions and methods are needed to enhance the characteristics of multiple layer glazing panels comprising infrared absorbing agents, and, specifically, multiple layer glazing panels comprising lanthanum hexaboride, so as to impart stability without detrimentally affecting optical qualities.

SUMMARY OF THE INVENTION

The present invention includes interlayers and multiple layer glazing panels comprising those interlayers, wherein the interlayers comprise lanthanum hexaboride and an epoxy agent. The addition of an epoxy agent surprisingly provides a stabilization effect to the lanthanum hexaboride, which allows for the production of interlayers that advantageously absorb infrared radiation and resist environmental degradation.

DETAILED DESCRIPTION

Figure 1:
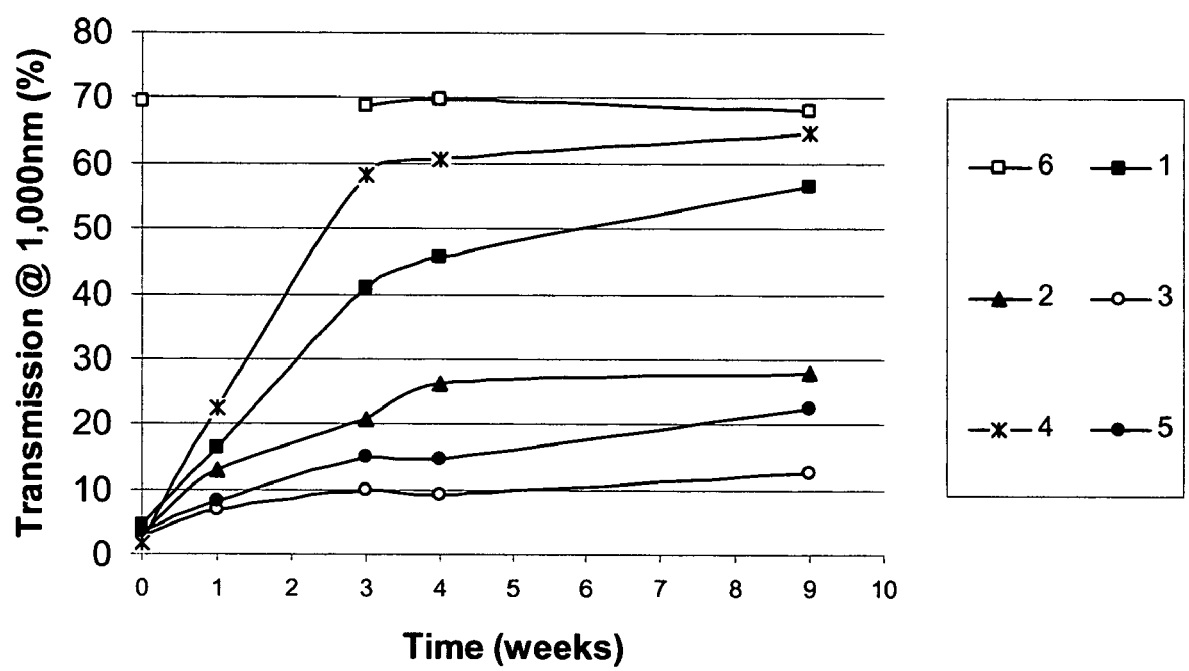
FIG. 1 is a graph showing percent transmission of light at 1,000 nanometers for six glass laminates over time at 50° C. and 95% relative humidity.

The present invention involves infrared absorbing agents and their use in interlayers and multiple layer glazing panels comprising those interlayers. As used herein, a "multiple layer glazing interlayer" means an interlayer that can be used in a glazing having more than one layer, for example, two panes of glass with an interlayer therebetween. Interlayers can consist of a single polymer layer or multiple layers combined. Glazing panels can be used, for example, in automotive windshields and architectural applications. As disclosed herein, lanthanum hexaboride and an epoxy agent are incorporated into or onto polymer sheets that are useful as interlayers or layers within interlayers for use in multiple layer glazing panel applications. As will be described in detail below, polymer sheets of the present invention can comprise any suitable polymer, and, in preferred embodiments, polymer sheets comprise poly(vinyl butyral).

Previous attempts in the art to reduce infrared radiation include using various infrared reflective layers (see, for example, U.S. Pat. Nos. 6,391,400, 5,245,468, and 2002/0150744) or various infrared absorbing agents that are distributed on or within polymeric layers (see, for example, U.S. Pat. Nos. 6,737,159, 6,506,487, 6,620,872, 6,673,456, 2002/0054993, 2003/0094600, 2003/0122114, 2003/0054160, and International Patent Application WO02/077081). The use of separate infrared reflecting layers, however, can require time consuming and inefficient processing steps, while the use of infrared absorbing agents can present several difficulties, among which is the gradual degradation of those agents due to environmental conditions, such as, for example, high moisture conditions or acidic conditions.

The present invention includes interlayers comprising lanthanum hexaboride and an epoxy agent. As will be described in detail, below, any suitable lanthanum hexaboride and epoxy agent can be used.

Lanthanum hexaboride and epoxy agents of the present invention can be disposed on or within one or more layers of an interlayer. In various embodiments, the lanthanum hexaboride and epoxy agents are disposed in or on a polymer sheet that is incorporated in an interlayer. In these embodiments, the interlayer can comprise only the single polymer sheet, or can be a multiple layer interlayer comprising the polymer sheet. Embodiments in which multiple layer interlayers are used include those that are known in the art, and include, for example and without limitation, interlayers having two or more polymer sheets laminated together to form a single interlayer, and interlayers having one or more polymer sheets laminated together with one or more polymer films, which will be described in detail below. In any of these embodiments, the lanthanum hexaboride and epoxy agents can be disposed on or within any one or more of the layers, including polymer sheets and polymer films, and the various layers can be the same or different.

Exemplary multiple layer interlayer constructs include the following:

(polymer sheet)$_n$ (polymer sheet/polymer film/polymer sheet)$_p$ where n is 1 to 10 and, in various embodiments, is less than 5, and p is 1 to 5, and, in various embodiments, is less than 3.

Interlayers of the present invention can be incorporated into multiple layer glazing panels, and, in various embodiments, are incorporated between two layers of glass. Applications for such constructs include automobile windshields and architectural glass, among others.

In embodiments in which an interlayer is disposed between two layers of glass, interlayers of the present invention incorporating lanthanum hexaboride and epoxy agents of the present invention are particularly useful where the edge of the multiple layer glazing panel are exposed to the environment, such as for automotive windshields and side windows.

In other embodiments of the present invention, interlayers comprising infrared absorbing agents are used in bilayers. As used herein, a bilayer is a multiple layer construct having a rigid substrate, such as glass or acrylic, with an interlayer disposed thereon. A typical bilayer construct is: (glass)// (polymer sheet)//(polymer film). The infrared absorbing agents of the present invention are particularly useful for bilayers because the exposed polymer film typically allows moisture ingress through the polymer film and into the polymer sheet. Bilayer constructs include, for example and without limitation:

(Glass)//((polymer sheet)$_h$//(polymer film))$_g$ (Glass)//(polymer sheet)$_h$//(polymer film)

where h is 1 to 10, and, in various embodiments is less than 3, and g is 1 to 5, and, in various embodiments, is less than 3.

In further embodiment, interlayers as just described can be added to one side of a multiple layer glazing panel to act as a spall shield, for example and without limitation:

(Multiple Layer Glazing panel)//((polymer sheet)$_h$// (polymer film))$_g$ (Multiple Layer Glazing panel)//(polymer sheet)$_h$// (polymer film)

where h is 1 to 10, and, in various embodiments is less than 3, and g is 1 to 5, and, in various embodiments, is less than 3.

In addition to the lanthanum hexaboride and epoxy agents of the present invention, one or more conventional infrared absorbing agents or infrared reflecting layers can be incorporated into interlayers of the present invention.

In various embodiments, solar control glass (solar glass) is used for one or more multiple layer glass panels of the present invention. Solar glass can be any conventional glass that incorporates one or more additives to improve the optical qualities of the glass, and specifically, solar glass will typically be formulated to reduce or eliminate the transmission of undesirable wavelengths of radiation, such as near infrared and ultraviolet. Solar glass can also be tinted, which results in, for some applications, a desirable reduction of transmission of visible light. Examples of solar glass that are useful in the present invention are bronze glass, gray glass, low E (low emissivity) glass, and solar glass panels as are known in the art, including those disclosed in U.S. Pat. Nos. 6,737,159 and 6,620,872. As will be described below, rigid substrates other than glass can be used.

In various embodiments of the present invention, lanthanum hexaboride and epoxy agents of the present invention are disbursed on or within a polymer sheet and/or a polymer film. The concentration of lanthanum hexaboride and epoxy agents, and the ratio between them, can be adjusted to suit the needs of the particular application. Generally, lanthanum hexaboride levels will be sufficient to impart the desired infrared absorbance on the sheet and epoxy agents will be included in an amount sufficient to provide the desired stability, depending on the application.

In various embodiments, a polymer sheet of the present invention comprising lanthanum hexaboride and an epoxy agent absorbs at least 5%, at least 15%, at least 25%, at least 50%, at least 75%, or at least 90% of the infrared radiation between 700 nanometers and 2,000 nanometers while transmitting at least 60%, at least 70%, at least 80%, at least 90%, or at least 95% of the visible light.

Lanthanum Hexaboride

The preparation of lanthanum hexaboride and its incorporation into or onto polymeric substrates is well known in the art (see, for example, U.S. Pat. Nos. 6,620,872 and 6, 911, 254). Lanthanum hexaboride is available, for example, as a dispersion of solid particles in liquid, with zirconium and dispersion agents included as appropriate.

Lanthanum hexaboride can be incorporated into polymer sheets of the present invention in any suitable amount, and will generally be incorporated in an amount that is sufficient to provide the desired near infrared absorbance without also excessively impacting optical performance. In various embodiments, lanthanum hexaboride is incorporated into polymer sheets in amounts of 0.005 to 0.1 weight percent, 0.01 to 0.05 weight percent, or 0.01 to 0.04 weight percent. In embodiments in which other infrared absorbers are used, the amount of lanthanum hexaboride can be reduced appropriately. Examples of other useful infrared absorbers include indium tin oxide and doped tin oxide, among others.

Lanthanum hexaboride can be incorporated into polymer sheets, and specifically into poly(vinyl butyral) sheets, by, for example, melt mixing the lanthanum hexaboride into a melt comprising poly(vinyl butyral), a plasticizer, and, optionally, other additives. Lanthanum hexaboride can also be incorporated onto a polymer sheet that has already been formed using, for example, spray techniques or dipping techniques, among others.

Lanthanum hexaboride that is useful in the present invention can be nano-sized, ground particles, for example, less than 250 nanometers, less than 200 nanometers, less than 150 nanometers, or less than 100 nanometers in size.

Epoxy Agents

Any suitable epoxy agent can be used with the present invention, as are known in the art (see, for example, U.S. Pat. Nos. 5,529,848 and 5,529,849).

In various embodiments, epoxy compositions found usable as hereinafter described are selected from (a) epoxy resins comprising mainly the monomeric diglycidyl ether of bisphenol-A; (b) epoxy resins comprising mainly the monomeric diglycidyl ether of bisphenol-F; (c) epoxy resins comprising mainly the hydrogenated diglycidyl ether of bisphenol-A; (d) polyepoxidized phenol novolacs; (e) diepoxides of polyglycols, alternatively known as an epoxy terminated polyether; and (f) a mixture of any of the foregoing epoxy resins of (a)

through (e) (see the Encyclopedia of Polymer Science and Technology, Volume 6, 1967, Interscience Publishers, N.Y., pages 209-271).

A suitable comrnmercially available diglycidyl ether of bisphenol-A of class (a) is DER 331 from Dow Chemical Company. A diglycidyl ether of bisphenol-F epoxy of class (b) is EPON Resin DPL-862 and a hydrogenated diglycidyl ether of bisphenol-A epoxy of class (c) is EPONEX Resin 1510, both of which are available from Shell Chemical Company. A Polyepoxidized phenol formaldehyde novolac of class (d) is available from Dow Chemical as DEN 431. A diepoxide of poly(oxypropylene) glycol of class (e) is available from Dow Chemical as DER 732.

Further examples of suitable epoxy agents include 3,4-epoxycyclohexane carboxylate compositions of the type described in U.S. Pat. No. 3,723,320. Also useful are diepoxides such as those disclosed in U.S. Pat. No. 4,206,067 that contain two linked cyclohexane groups to each of which is fused an epoxide group. Such diepoxide compounds correspond to the formula:

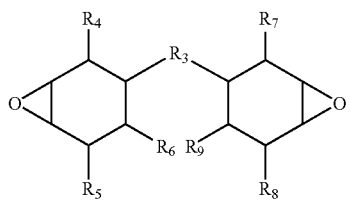

wherein $R_3$ is an organic group containing 1 to 10 carbon atoms, from 0 to 6 oxygen atoms, and from 0 to 6 nitrogen atoms, and $R_4$ through $R_9$ are independently selected from among hydrogen and aliphatic groups containing 1 to 5 carbon atoms. Exemplary diepoxides include 3,4-epoxycyclohexylmethyl-3,4-epoxycyclohexane, bis (3,4-epoxy-6-methylcyclohexylmethyl adipate), and 2-(3,4-epoxycyclohexyl)-5,5-spiro(3,4-epoxy)cyclohexane-m-dioxane.

A further useful epoxy is 2-ethylhexyl glycidyl ether (available from Resolution Products, Houston Tex., as Heloxy Modifier 116).

Further useful epoxies include diepoxides of poly(oxypropylene) glycol, 2-ethylhexyl glycidyl ether, and diepoxide products of epichlorohydrin and polypropylene glycol.

Mixtures of epoxy agents can also be used.

Epoxy agents can be incorporated in any suitable amount, with the type of epoxy agent or agents, the composition of the polymer sheet, and the amount of lanthanum hexaboride factoring into the determination.

In various embodiments, epoxy agents are incorporated at a weight percent of 0.1 to 10.0, 0.1 to 5.0, 0.5 to 4.0, or 1.0 to 3.5 weight percent of a polymer sheet. These values can be combined with the values given above for lanthanum hexaboride in any combination.

Polymer Film

As used herein, a "polymer film" means a relatively thin and rigid polymer layer that functions as a performance enhancing layer. Polymer films differ from polymer sheets, as used herein, in that polymer films do not themselves provide the necessary penetration resistance and glass retention properties to a multiple layer glazing structure, but rather provide performance improvements, such as infrared absorption character. Poly(ethylene terephthalate) is most commonly used as a polymer film.

In various embodiments, the polymer film layer has a thickness of 0.013 mm to 0.20 mm, preferably 0.025 mm to 0.1 mm, or 0.04 to 0.06 mm. The polymer film layer can optionally be surface treated or coated to improve one or more properties, such as adhesion or infrared radiation reflection. These functional performance layers include, for example, a multi-layer stack for reflecting infrared solar radiation and transmitting visible light when exposed to sunlight. This multi-layer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known, (see, for example, U.S. Pat. Nos. 4,017,661 and 4,786,783), the metal layer(s) may optionally be electrically resistance heated for defrosting or defogging of any associated glass layers.

An additional type of polymer film that can be used with the present invention, which is described in U.S. Pat. No. 6,797,396, comprises a multitude of nonmetallic layers that function to reflect infrared radiation without creating interference that can be caused by metallic layers.

The polymer film layer, in some embodiments, is optically transparent (i.e. objects adjacent one side of the layer can be comfortably seen by the eye of a particular observer looking through the layer from the other side), and usually has a greater, in some embodiments significantly greater, tensile modulus regardless of composition than that of any adjacent polymer sheet. In various embodiments, the polymer film layer comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers, and the like. In various embodiments, the polymer film layer comprises materials such as re-stretched thermoplastic films having the noted properties, which include polyesters, for example poly(ethylene terephthalate) and poly(ethylene terephthalate) glycol (PETG). In various embodiments, poly(ethylene terephthalate) is used, and, in various embodiments, the poly(ethylene terephthalate) has been biaxially stretched to improve strength, and has been heat stabilized to provide low shrinkage characteristics when subjected to elevated temperatures (e.g. less than 2% shrinkage in both directions after 30 minutes at 150° C.).

Various coating and surface treatment techniques for poly(ethylene terephthalate) film that can be used with the present invention are disclosed in published European Application No.0157030. Polymer films of the present invention can also include a hardcoat and/or and antifog layer, as are known in the art.

Polymer Sheet

The following section describes the various materials, such as poly(vinyl butyral), that can be used to form polymer sheets of the present invention.

As used herein, a "polymer sheet" means any thermoplastic polymer composition formed by any suitable method into a thin layer that is suitable alone, or in stacks of more than one layer, for use as an interlayer that provides adequate penetration resistance and glass retention properties to laminated glazing panels. Plasticized poly(vinyl butyral) is most commonly used to form polymer sheets.

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, such as acetates, salts, and alcohols. As used herein, "melt" refers to a melted mixture of resin with a plasticizer and, optionally, other additives.

The polymer sheets of the present invention can comprise any suitable polymer, and, in a preferred embodiment, as exemplified above, the polymer sheet comprises poly(vinyl butyral). In any of the embodiments of the present invention given herein that comprise poly(vinyl butyral) as the polymeric component of the polymer sheet, another embodiment is included in which the polymer component consists of or consists essentially of poly(vinyl butyral). In these embodiments, any of the variations in additives, including plasticizers, disclosed herein can be used with the polymer sheet having a polymer consisting of or consisting essentially of poly(vinyl butyral).

In one embodiment, the polymer sheet comprises a polymer based on partially acetalized poly(vinyl alcohol)s. In another embodiment, the polymer sheet comprises a polymer selected from the group consisting of poly(vinyl butyral), polyurethane, poly(vinyl chloride), poly(ethylene vinyl acetate), combinations thereof, and the like. In further embodiments the polymer sheet comprises poly(vinyl butyral) and one or more other polymers. Other polymers having a suitable glass transition temperature can also be used. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful components in polymer sheets.

For embodiments comprising poly(vinyl butyral), the poly (vinyl butyral) can be produced by known acetalization processes, as are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, $3^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

In various embodiments, the polymer sheet resin comprising poly(vinyl butyral) comprises 10 to 35 weight percent (wt. %) hydroxyl groups calculated as poly(vinyl alcohol), 13 to 30 wt. % hydroxyl groups calculated as poly(vinyl alcohol), or 15 to 22 wt. % hydroxyl groups calculated as poly (vinyl alcohol). The polymer sheet resin can also comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups in a minor amount, for example, a 2-ethyl hexanal group (see, for example, U.S. Pat. No. 5,137,954).

In various embodiments, the polymer sheet comprises poly (vinyl butyral) having a molecular weight at least 30,000, 40,000, 50,000, 55,000, 60,000, 65,000, 70,000, 120,000, 250,000, or at least 350,000 grams per mole (g/mole or Daltons). Small quantities of a dialdehyde or trialdehyde can also be added during the acetalization step to increase molecular weight to at least 350,000 g/mole (see, for example, U.S. Pat. Nos. 4,902,464; 4,874,814; 4,814,529; and, 4,654,179). As used herein, the term "molecular weight" means the weight average molecular weight.

Various adhesion control agents can be used in polymer sheets of the present invention, including sodium acetate, potassium acetate, and magnesium salts. Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis(2-ethyl butyrate)(chemical abstracts number 79992-76-0). In various embodiments of the present invention the magnesium salt is magnesium bis(2-ethyl butyrate). Because epoxy agents tend to increase the adhesiveness of a polymer sheet, relatively greater amounts of adhesion control agents will generally be used in interlayers of the present invention.

Other additives may be incorporated into the polymer sheet to enhance its performance in a final product. Such additives include, but are not limited to, dyes, pigments, stabilizers (e.g., ultraviolet stabilizers), antioxidants, antiblock agents, additional IR absorbers, flame retardants, combinations of the foregoing additives, and the like, as are known in the art.

In various embodiments of polymer sheets of the present invention, the polymer sheets can comprise 20 to 60, 25 to 60, 20 to 80, 10 to 70, or 10 to 100 parts plasticizer phr. Of course other quantities can be used as is appropriate for the particular application. In some embodiments, the plasticizer has a hydrocarbon segment of fewer than 20, fewer than 15, fewer than 12, or fewer than 10 carbon atoms.

The amount of plasticizer can be adjusted to affect the glass transition temperature ($T_g$) of the poly(vinyl butyral) sheet. In general, higher amounts of plasticizer are added to decrease the $T_g$. Poly(vinyl butyral) polymer sheets of the present invention can have a $T_g$ of 40° C. or less, 35° C. or less, 30° C. or less, 25° C. or less, 20° C. or less, and 15° C. or less.

Any suitable plasticizers can be added to the polymer resins of the present invention in order to form the polymer sheets. Plasticizers used in the polymer sheets of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, mixtures of phosphates and adipates such as disclosed in U.S. Pat. No. 3,841,890, adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779, and $C_6$ to $C_8$ adipate esters, such as hexyl adipate. In various embodiments, the plasticizer used is dihexyl adipate and/or triethylene glycol di-2 ethylhexanoate.

The poly(vinyl butyral) polymer, plasticizer, and any additives can be thermally processed and configured into sheet form according to methods known to those of ordinary skill in the art. One exemplary method of forming a poly(vinyl butyral) sheet comprises extruding molten poly(vinyl butyral) comprising resin, plasticizer, and additives by forcing the melt through a die (for example, a die having an opening that is substantially greater in one dimension than in a perpendicular dimension). Another exemplary method of forming a poly(vinyl butyral) sheet comprises casting a melt from a die onto a roller, solidifying the resin, and subsequently removing the solidified resin as a sheet. In various embodiments, the polymer sheets can have thicknesses of, for example, 0.1 to 2.5 millimeters, 0.2 to 2.0 millimeters, 0.25 to 1.75 millimeters, and 0.3 to 1.5 millimeters.

For each embodiment described above comprising a glass layer, another embodiment exists, where suitable, wherein a non-glass glazing type material is used in place of the glass. Examples of such glazing layers include rigid plastics having a high glass transition temperature, for example above 60° C. or 70° C., for example polycarbonates and polyalkyl methacrylates, and specifically those having from 1 to 3 carbon atoms in the alkyl moiety.

Also included in the present invention are stacks or rolls of any of the polymer sheets and interlayers of the present invention disclosed herein in any combination.

The present invention also includes windshields, windows, and other finished glazing products comprising any of the interlayers of the present invention.

The present invention includes methods of manufacturing interlayers and glazing panels comprising forming an interlayer or glazing panel of the present invention using any of the polymer sheets of the present invention described herein.

Also included herein within the scope of the present invention are methods of reducing transmission of infrared and/or near infrared radiation through an opening, comprising the step of disposing in said opening any of the polymer sheet constructs of the present invention, for example, within a windshield or glazing panel.

The present invention further includes a method of manufacturing a polymer sheet, comprising mixing an epoxy agent and lanthanum hexaboride in a melt of any of the polymers described herein, and then forming a polymer sheet.

Various polymer sheet and/or laminated glass characteristics and measuring techniques will now be described for use with the present invention.

The clarity of a polymer sheet can be determined by measuring the haze value, which is a quantification of the scattered light by a sample in contrast to the incident light. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

Pummel adhesion can be measured according to the following technique, and where "pummel" is referred to herein to quantify adhesion of a polymer sheet to glass, the following technique is used to determine pummel. Two-ply glass laminate samples are prepared with standard autoclave lamination conditions. The laminates are cooled to about −17° C. (0° F.) and manually pummeled with a hammer to break the glass. All broken glass that is not adhered to the poly(vinyl butyral) sheet is then removed, and the amount of glass left adhered to the poly(vinyl butyral) sheet is visually compared with a set of standards. The standards correspond to a scale in which varying degrees of glass remain adhered to the poly(vinyl butyral) sheet. In particular, at a pummel standard of zero, no glass is left adhered to the poly(vinyl butyral) sheet. At a pummel standard of 10, 100% of the glass remains adhered to the poly(vinyl butyral) sheet. For laminated glass panels of the present invention, various embodiments have a pummel of at least 3, at least 5, at least 8, at least 9, or 10. Other embodiments have a pummel between 8 and 10, inclusive.

The "yellowness index" of a polymer sheet can be measured according to the following: Transparent molded disks of polymer sheet 1 cm thick, having smooth polymeric surfaces which are essentially plane and parallel, are formed. The index is measured according to ASTM method D 1925, "Standard Test Method for Yellowness Index of Plastics" from spectrophotometric light transmittance in the visible spectrum. Values are corrected to 1 cm thickness using measured specimen thickness.

As used herein, "average particle size" is calculated by direct measurement of a large number of electron microscope images of dispersed particles.

EXAMPLES

Example 1

Six polymer sheets are formed having the compositions shown in the table below (all numbers shown as weight percent). Lanthanum hexaboride based on KHV-11 dispersion has a small concentration of relatively large particles (about 200 nanometers) that cause scattering of visible light. To reduce visible light scattering reduced particle size lanthanum hexaboride particles are used in dispersion KHDV-05A. These smaller particles are, however, more prone to hydrolysis than the larger particles in KHV-11. The additives are premixed with poly(vinyl butyral) powder resin and blended during sheet extrusion in a single screw extruder. Sheet of 0.76 mm thickness is extruded using a sheeting dye.

| Reference | Lanthanum Hexaboride (KHDV-05A) | DER 732 Epoxy Resin | Citric Acid | EDTA | Lanthanum Hexaboride (KHV-11) |
|---|---|---|---|---|---|
| 1 | 0.04 | — | — | — | — |
| 2 | 0.04 | — | — | 0.057 | — |
| 3 | 0.04 | 1.8 | — | — | — |
| 4 | 0.04 | — | 0.038 | — | — |
| 5 | — | — | — | — | 0.04 |
| 6 (control) | — | — | — | — | — |

The six polymer sheets are laminated between two 2.3 millimeter thick sheets of glass. The six resulting multiple layer laminated glazing panels are measured for transmittance of light at 1,000 nanometers at the edge of the panels. Results are recorded, and the six panels are then placed in an environment of 50° C. and 95% relative humidity. Further sampling of transmittance of light at 1,000 nanometers at the edges of the panels is performed for nine weeks. Results are shown in FIG. 1.

Figure 2:
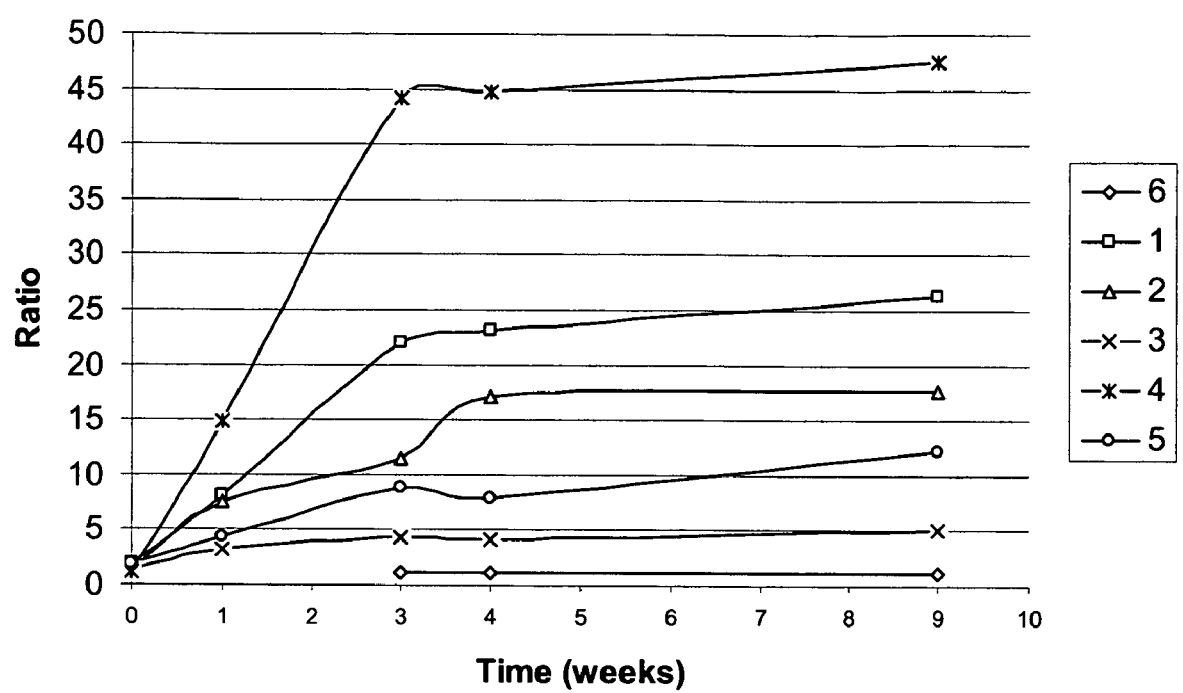
FIG. 2 is a graph showing the edge/interior ratio of percent transmission of light at 1,000 nanometers for six glass laminates over time at 50° C. and 95% relative humidity.

The six multiple layer glazing laminates are also sampled over a nine week period for transmittance at 1,000 nanometers in the center of the panels, where ingress of moisture is expected to be limited. The ratio of the transmittance at 1,000 nanometers of the edges of each panel to the centers of those same panels over the four week period is shown in FIG. 2.

Figure 3:
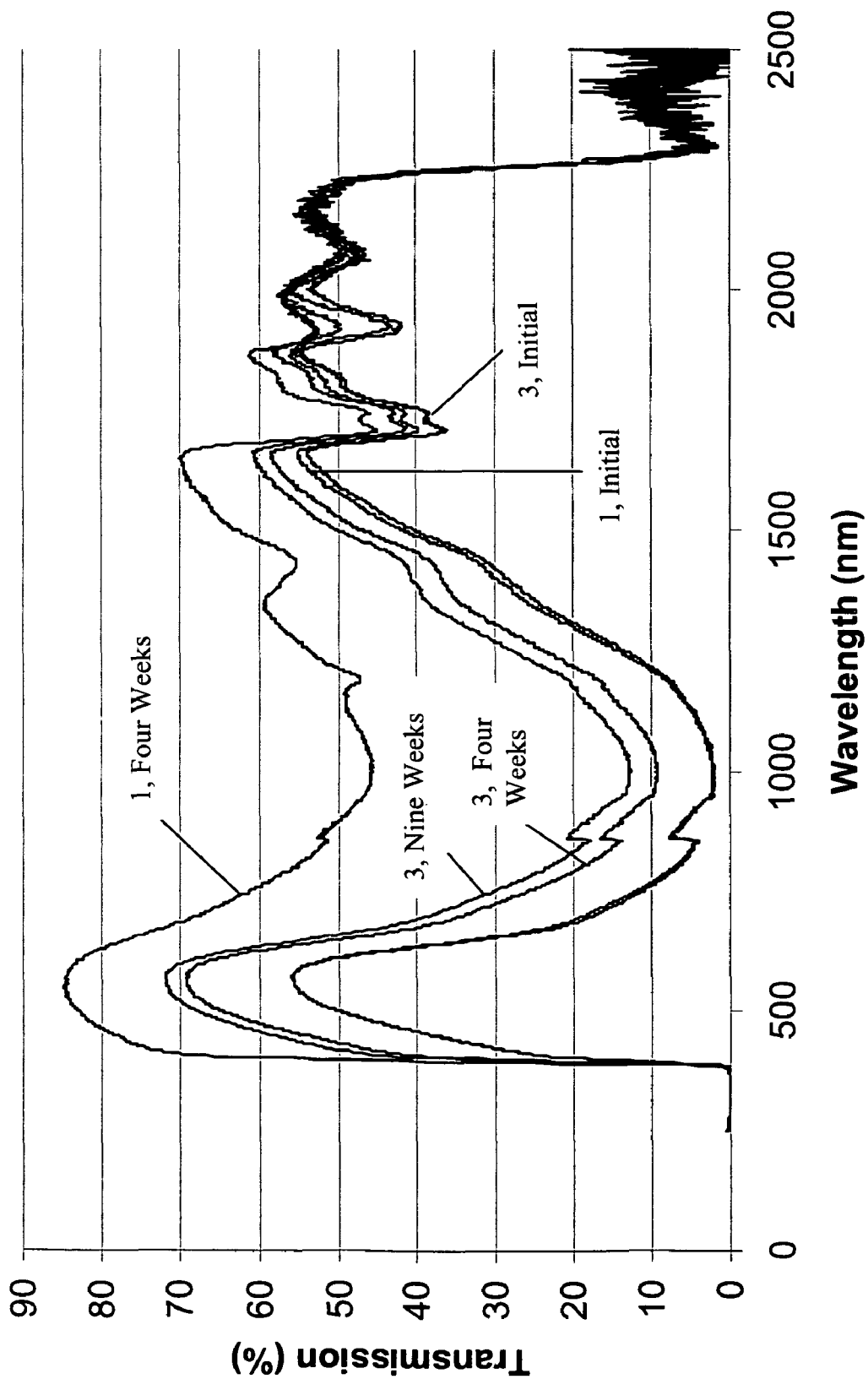
FIG. 3 is a graph showing spectral curves for two glass laminates at two time points taken at the edge of the glass laminates at 50° C. and 95% relative humidity.

FIG. 3 is a graph displaying initial, fourth week, and ninth week transmittance spectra for the multiple layer glazing panels formed from polymer sheets with reference numbers 1 and 3.

By virtue of the present invention, it is now possible to provide interlayers, such as poly(vinyl butyral) sheet, and other polymer sheet, with superior, selective infrared transmission reduction characteristics that are resistant to degradation caused by environmental factors.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, and that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer sheet can be formed comprising lanthanum hexaboride in any of the ranges given in addition to comprising epoxy agents in any of the ranges given, where appropriate, to form many permutations that are within the scope of the present invention, but that would be cumbersome to list.

Any figure reference numbers given within the abstract or any claims are for illustrative purposes only and should not be construed to limit the claimed invention to any one particular embodiment shown in any figure.

Figures are not drawn to scale unless otherwise indicated.

Each reference, including journal articles, patents, applications, and books, referred to herein is hereby incorporated by reference in its entirety.

We claim:

1. A multiple layer glazing interlayer comprising a poly(vinyl) butyral sheet; wherein:
    lanthanum hexaboride and an epoxy agent are dispersed within the poly(vinyl) butyral sheet;
    the epoxy agent is selected from the group consisting of: diepoxides of poly(oxyproplene) glycol, 2-ethylhexyl glycidyl ether, and diepoxide products of epichlorohydrin and polypropylene glycol;
    said epoxy agent is present in an amount of 0.1 to 10.0 weight percent of the poly(vinyl) butyral sheet; and
    said lanthanum hexaboride is present in an amount of 0.005-0.1 weight percent of the poly(vinyl) butyral sheet.

2. The interlayer of claim 1, wherein said epoxy agent is present in an amount of 0.5 to 4.0 weight percent of the poly(vinyl) butyral sheet.

3. The interlayer of claim 1, wherein said lanthanum hexaboride is present in an amount of 0.005-0.05 weight percent of the poly(vinyl) butyral sheet.

4. The interlayer of claim 1, wherein said epoxy agent is present in an amount of 0.1 to 4.0 weight percent of the poly(vinyl) butyral sheet and said lanthanum hexaboride is present in an amount of 0.005 to 0.05 weight percent of the poly(vinyl) butyral sheet.

5. A multiple layer glazing interlayer comprising at least two poly(vinyl) butyral sheets; wherein:
    Lanthanum hexaboride and an epoxy agent are dispersed within the poly(vinyl) butyral sheets;
    the epoxy agent is selected from the group consisting of: diepoxides of poly(oxypropylene) glycol, 2-ethylhexyl glycidyl ether, and diepoxide products of epichlorohydrin and polypropylene glycol;
    said epoxy agent is present in an amount of 0.1 to 10.0 weight percent of each of the poly(vinyl) butyral sheets; and
    said lanthanum hexaboride is present in an amount of 0.005-0.1 weight percent of each of the poly(vinyl) butyral sheets.

6. A multiple layer glazing comprising an interlayer, the interlayer comprising:
    a rigid substrate; and
    a poly(vinyl) butyral sheet; wherein
        lanthanum hexaboride and an epoxy agent are dispersed within the poly(vinyl) butyral sheets;
        the epoxy agent is selected from the group consisting of: diepoxides of poly(oxypropylene) glycol, 2-ethylhexyl glycidyl ether, and diepoxide products of epichlorohydrin and polypropylene glycol;
        said epoxy agent is present in an amount of 0.1 to 10.0 weight percent of the poly(vinyl) butyral sheet; and
        said lanthanum hexaboride is present in an amount of 0.005-0.1 weight percent of the poly(vinyl) butyral sheet.

7. The glazing of claim 6, wherein said epoxy agent is present in an amount of 0.5 to 4.0 weight percent of the poly(vinyl) butyral sheet.

8. The glazing of claim 6, wherein said lanthanum hexaboride is present in an amount of 0.005-0.05 weight percent of the poly(vinyl) butyral sheet.

9. The glazing of claim 6, wherein said epoxy agent is present in an amount of 0.1 to 4.0 weight percent of the poly(vinyl) butyral sheet; and said lanthanum hexaboride is present in an amount of 0.005 to 0.05 weight percent of the poly(vinyl) butyral sheet.

* * * * *